Patented June 7, 1949

2,472,289

UNITED STATES PATENT OFFICE 2,472,289

BANANA PULP FREE FROM STARCH

Carl Ermert, Cincinnati, Ohio

No Drawing. Application August 25, 1947,
Serial No. 770,553

1 Claim. (Cl. 99—100)

This invention relates to a banana pulp free from starch, in which the remaining juices therein are substantially, uniformly distributed throughout the pulp, and in which the banana pulp, the starch conversion to sugars has been carried on appreciably further than is normally possible, whereby the flavor is appreciably greater than normally, and which pulp is highly digestible and ready to serve without additional preparing as it is now being used for Celiac Disease, infant dietary and other food purposes. This application is a continuation-in-part of applicant's parent application Serial No. 730,745, filed February 25, 1947.

The object of this invention is a process of converting the starch content of the banana pulp completely to sugars. This rapid chemical change is produced by the naturally occurring enzymes in the presence of the naturally occurring ethylene of the fruit, at elevated temperatures in an atmosphere of reduced pressure within a limited space in a hydrolyzing converter.

A further object is a banana pulp of the above character that in which the pulp is a sucrose with an invert sugar and like most sugars is easily assimilated. Babies take this banana pulp very willingly and are apparently able to digest and assimilate a surprising amount of it. In feeding the banana it is important that the starch content of the banana has been converted to sugars. One sometimes is handicapped by the fact that bananas are not always available or because one does not know how to tell if the proper stage of the starch conversion to sugars has been reached. In order to overcome such difficulties, I have by my invention, developed a scientifically standardized banana pulp free from starch available at any time of the year.

A further object of this invention has been to provide a process of hydrolysis with the naturally occurring enzymes at elevated temperatures in an atmosphere of reduced pressure within a limited space, thereby liberating the naturally occurring ethylene content of the banana pulp and increasing the activity of the hydrolyzing enzymes to convert the starch content of the banana pulp into sugars in such a manner that it has a pleasing yellow color with the characteristic aroma of bananas and the characteristic banana taste. I use matured ripening bananas for making my banana pulp because at this stage the fruit liberates large quantities of naturally occurring ethylene. I have by my invention isolated and harnessed the naturally occurring ethylene content of the banana, and since ethylene is produced by plant tissue it is correct to refer to my invention as one of naturally occurring reaction, and by the presence of the naturally occurring ethylene the reaction of starch to sugars takes place at a lower temperature than is normally possible.

The principal object of my invention has been to provide a process of hydrolysis with naturally occurring enzymes at elevated temperatures in an atmosphere of reduced pressure within a limited space to allow the vapors of the naturally occurring ethylene content from the peeled matured ripening bananas, to be liberated throughout the pulp and the starch conversion to sugars is accelerated by the indirect effect of the naturally occurring ethylene upon the enzymes of the bananas in hastening the general metabolism of the tissues.

A further object of my invention is that all processing is done at place of origin, such as the Central American countries so as to allow the bananas to tree ripen until they have reached a stage of matured ripening fruit and is to the consumer's advantage, because it conserves its true flavor and food value and makes available at all times a scientifically standardized banana pulp, free from starch.

In describing my invention more specifically, the peeled matured ripening bananas are placed in a stainless steel steam jacketed hydrolyzing converter of limited space in an atmosphere of reduced pressure and heated to 98 degrees Fahr. and is slowly increased to 140 degrees Fahr. The temperature is held between 140 to 160° Fahr. for 30 minutes or more until the hydrolysis of the starch content of the banana pulp is complete. The end point is controlled by observing the changing of the original iodine blue color to the definite brown or reddish brown, indicating the proper stage of the starch conversion to sugar has been reached. Now the pulp is sieved, homogenized flash pasteurized and vacuum packed.

This process requires accurate atmospheric and temperature controls conducted in an air conditioned room at 68 degrees Fahr. with a relative humidity of 40 to 50 per cent. The temperature at which a banana is heated is very important as boiling destroys the enzymes and certain vitamin values present. Temperatures between 140 to 160° Fahrenheit are permissible.

Having thus described my invention, I claim:

A process of making panana pulp free from starch which comprises heating peeled matured ripening bananas to 98° F. and slowly increasing the temperature to 140–160° F. within a confined space in an atmosphere of reduced pressure, whereby the naturally occurring ethylene is liberated from the banana throughout the pulp to cause an increase in activity of the naturally occurring enzymes; and finally terminating the heating when the hydrolysis of the starch in the banana pulp is complete.

CARL ERMERT.

REFERENCES CITED

The following references are of record in the file of this patent:

UNITED STATES PATENTS

| Number | Name | Date |
| --- | --- | --- |
| 776,999 | Caspar | Dec. 6, 1904 |
| 1,829,743 | Dupont | Nov. 3, 1931 |

OTHER REFERENCES

Everybody's Cook Book by Lord, 1924, page 400.

Commercial Fruit & Veg. by Cruess, 1938, page 768.